(12) United States Patent
Lambert (10) Patent No.: US 7,509,685 B2
(45) Date of Patent: Mar. 24, 2009

(54) DIGITAL RIGHTS MANAGEMENT

(75) Inventor: Martin R Lambert, Near Chinnor (GB)

(73) Assignee: SealedMedia Limited, Buckinghamshire (GB)

( * ) Notice: Subject to any disclaimer, the term of this patent is extended or adjusted under 35 U.S.C. 154(b) by 1037 days.

(21) Appl. No.: 10/480,037

(22) PCT Filed: Jun. 26, 2001

(86) PCT No.: PCT/GB01/02853

§ 371 (c)(1), (2), (4) Date: Dec. 9, 2003

(87) PCT Pub. No.: WO03/003173

PCT Pub. Date: Jan. 9, 2003

(65) Prior Publication Data

US 2004/0148523 A1   Jul. 29, 2004

(51) Int. Cl.
G06F 21/24 (2006.01)
(52) U.S. Cl. .............. 726/27; 726/29; 726/30; 705/55; 705/56
(58) Field of Classification Search ............ None
See application file for complete search history.

(56) References Cited

U.S. PATENT DOCUMENTS

| | | | |
|---|---|---|---|
| 4,779,224 A | 10/1988 | Moseley et al. | |
| 5,410,598 A | 4/1995 | Shear | |
| 5,588,146 A * | 12/1996 | Leroux | 707/1 |
| 5,956,697 A | 9/1999 | Usui | |
| 6,223,291 B1 | 4/2001 | Vogler et al. | |
| 7,039,811 B2 * | 5/2006 | Ito | 713/185 |
| 7,062,652 B2 * | 6/2006 | Hirota et al. | 713/172 |
| 7,083,095 B2 * | 8/2006 | Hendrick | 235/451 |
| 7,209,893 B2 * | 4/2007 | Nii | 705/26 |
| 2001/0005890 A1 | 6/2001 | Nitaki | |
| 2001/0052077 A1 * | 12/2001 | Fung et al. | 713/184 |
| 2002/0080969 A1 * | 6/2002 | Giobbi | 380/277 |

(Continued)

FOREIGN PATENT DOCUMENTS

EP   0 613 073 A   8/1994

(Continued)

OTHER PUBLICATIONS

Nokia—WAP on Web, http://web.archive.org/web/20000510201716/www.nokia.com/wap/wap.html, 2 pages.

(Continued)

Primary Examiner—Gilberto Barron, Jr.
Assistant Examiner—Minh Dinh
(74) Attorney, Agent, or Firm—Townsend and Townsend and Crew LLP (57) ABSTRACT

Digital rights are associated with a semi-unique node identifier obtained or calculated from characteristics of a mobile device attached to a consumer device, rather than with the node identifier of the consumer device itself. The user of the consumer device may access the digital rights management encrypted content (which may come from local persistent storage or a network) by attaching the mobile device to the consumer device. In this way, the rights can be associated with the node identifier of the mobile device, and the rights are thus usable for the consumer device to access the encrypted content.

32 Claims, 6 Drawing Sheets

PHONE LOCK

U.S. PATENT DOCUMENTS

2002/0083318 A1 * 6/2002 Larose .................. 713/164

FOREIGN PATENT DOCUMENTS

| EP | 0 851 335 S2 | 7/1998 |
| EP | 0 940 743 A1 | 9/1999 |
| EP | 0 987 860 A2 | 3/2000 |
| EP | 1 081 616 A | 3/2001 |
| GB | 2 317 476 | 3/1988 |
| GB | 2 228 807 A | 9/1990 |
| GB | 2 312 767 A | 11/1997 |
| WO | WO 90/13865 | 11/1990 |
| WO | WO 99/45455 | 9/1999 |
| WO | 00/58811 A | 10/2000 |
| WO | 01/31599 A | 5/2001 |

OTHER PUBLICATIONS

Tech Web: The Business Technology Network, http://www.techweb.com/encyclopedia/defineterm?term=hardwarekey, 2 pages.
Great Britain Search Report, Feb. 6, 2002, 1 page.
Great Britain Search Report, May 23, 2002, 1 page.

* cited by examiner

Fig.2.
BASIC NODE-LOCK CONCEPTS

Fig.3.

PORTABLE DEVICE LOCK-AUTHENTICATION

Fig.4.
PORTABLE DEVICE LOCK - STORAGE

1. Rights are transferred from DRM server to device X ( to which mobile device A is docked). As part of the transaction the rights are 'locked' to a semi-unique identifier obtained or calculated from characteristics of mobile device A.

2. The rights are stored on the mobile device A. Subsequent use of the rights involves X's DRM client re-obtaining and re-calculating the node identifier from the attached mobile device, checking that it matches the stored rights and accessing the rights from the mobile device.

3. As the rights are now stored on the mobile device, and 'locked' to that device, it may only be accessed from device Y by undocking the mobile device from X and docking it to Y.

4. Rights may also be copied / transferred on secondary removable storage such as floppy discs, flash RAM, SIMs, etc readable on either device.

But : telephone equipped mobile device can also:
(a) Maintain a trusted clock signal from a central server
(b) Itself connect to the DRM server to obtain, refresh or relinquish rights
(c) Piggyback DRM traffic on regular background cell communications
(d) Provide integrated billing/ micropayment with cellular telephony billing Fig.5.
PHONE LOCK 1. Rights are transferred from DRM server to device X (to which mobile device A is docked). As part of the transaction the rights are 'locked' to a semi-unique identifier obtained or calculated from characteristics of node device A.

2. The rights are also stored on the mobile device A. Subsequent use of the rights involves X's DRM client re-obtaining and re-calculating the node identifier from the attached mobile device, checking that it matches the stored rights and accessing the rights from the mobile device.

3. As the rights are now stored on the mobile device, and 'locked' to that device, it may only be accessed from device Y by undocking the mobile device from X and docking it to Y.

4. Rights may also be copied/transferred on secondary removable storage such as floppy discs, flash RAM, SIMs, etc readable on either device.

But: counterfeit-proof 'smart' cards either:
(a) Authenticate consumer to client and/or server-based DRM systems
(b) Store rights for off-line access via a smart-card reader attached to the consumer device Fig.6.
SMART CARD LOCK

DIGITAL RIGHTS MANAGEMENT

This application is the U.S. national phase of international application PCT/GB01/02853, filed in English on 26 Jun. 2001, which designated the U.S. The entire contents of this application is incorporated herein by reference.

The present invention is in the field of digital rights management (DRM). The present invention has particular applicability to node locking in the context of mobile devices.

If there is to be a viable commerce based upon the electronic distribution of valuable multimedia content (such as for example reports, images, music tracks, videos, etc.), then there must be some means of enforcing and retaining copyright control over the electronic content. There is now emerging a set of hardware and software solutions, generically known as digital rights management (DRM) solutions, that aim to provide this copyright control while, to a varying degree, also enabling new commercial models suited to the Internet and electronic delivery. Common to virtually all these solutions is the requirement that the multimedia content files be distributed within a persistent tamperproof encryption wrapper (the idea being that a million copies of encrypted content is no more valuable than one). Very simply, DRM works by carefully providing the consumers of this encrypted content with secret decryption keys that provide temporary access to the content for some controlled purpose, e.g. viewing, printing, playing, etc. without ever providing access to the raw decrypted content that could be used for unauthorised reuse or redistribution.

Figure 1:
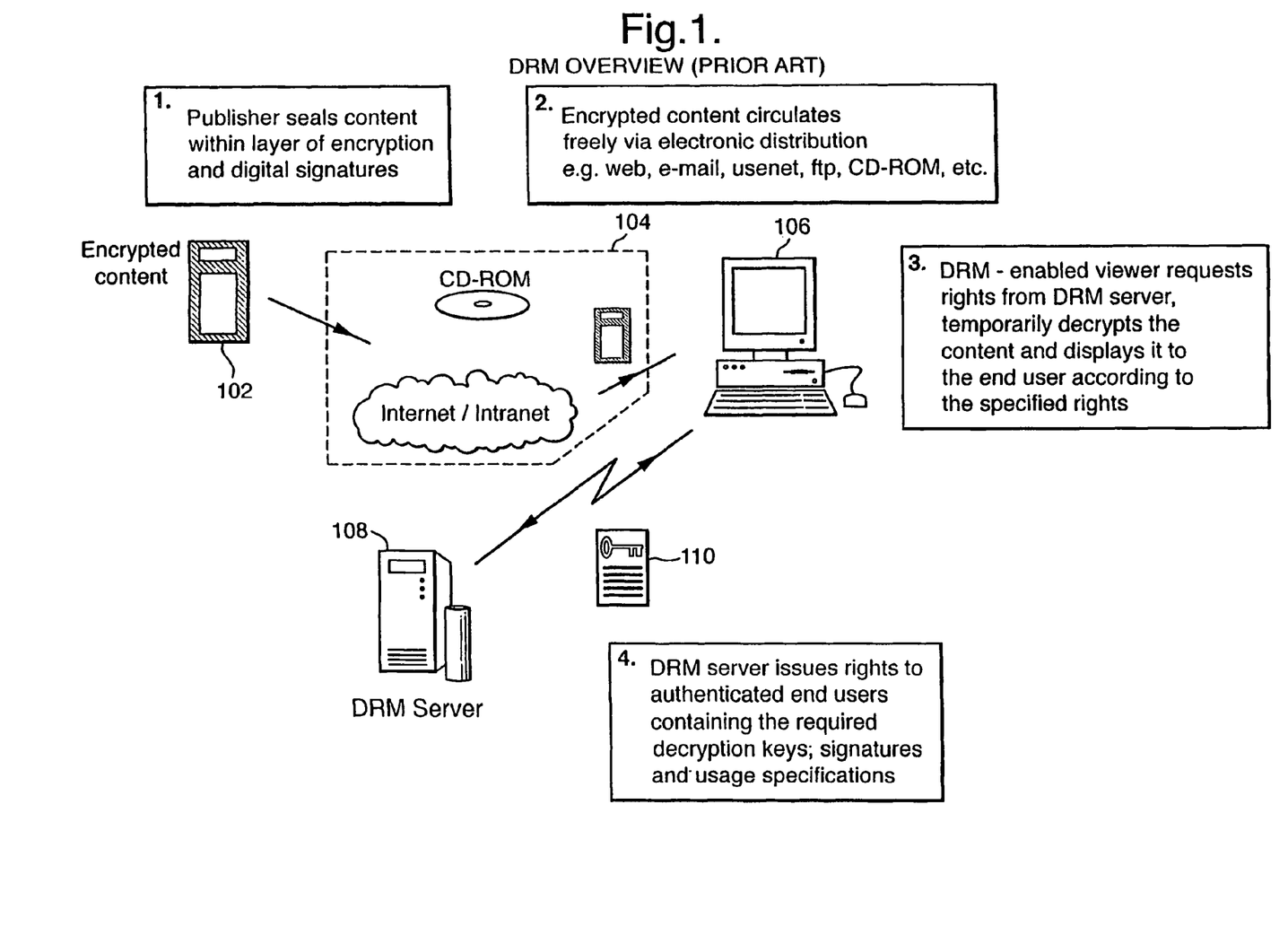
FIG. 1 illustrates schematically an overview of a prior art DRM approach.

FIG. 1 illustrates schematically an overview of how typical DRM systems work. Referring to FIG. 1, a "publisher" of digital content seals their digital content files, buffers or streams within a layer of encryption and digital signatures into a DRM-encrypted content format 102. The encryption makes it difficult for malicious consumers to obtain access to the raw decrypted content (and make unauthorised copies for redistribution). The digital signatures prevent malicious consumers from tampering with the encrypted content format (perhaps to pass off the content as their own) by enabling the DRM system to detect the smallest change to the encrypted content. The DRM-encrypted content 102 can then be delivered to consumers via any electronic distribution medium 104, e.g. web, ftp, email, CD-ROM, etc. The publisher need not worry about protecting the DRM-encrypted content 102 in transit to the consumer since it is inherently protected by its encryption layer and digital signatures.

Less sophisticated DRM systems sometimes bundle individual consumer access rights with the content, either within the encryption layer or at least protected by the digital signatures. The advantage of bundling rights with the content is that the consumer can obtain both the content and the rights at the same time. Disadvantages include extreme inflexibility in the rights management policies that can be implemented and an enormous versioning problem (since there needs to be a separate version of the encrypted content file 102 for each consumer and a new version of the encrypted content whenever the rights change).

More sophisticated DRM systems deliver the rights separately from the content (from a DRM server 108). The rights are encoded in some electronic format 110 (i.e. electronic "rights") and specify the permitted relationship between consumers and DRM-encrypted content sets (and subsets), e.g. which content the consumer can access, what they are permitted to do with it (e.g. printing), and for how long.

A specialised viewer (the DRM client 106) resident on the consumer device is required to obtain, manage and interpret the rights, temporarily decrypt the encrypted content and view/play it within a secure environment (so that the consumer cannot obtain access to the raw decrypted content or the decryption keys) subject to the restrictions implied by the consumer's rights (e.g. view but do not print a document). The DRM server 108 is responsible for issuing rights to requesting DRM clients 106. Current DRM systems typically issue rights to authenticated consumers is at the time of purchase (or grant) and the rights are transferred to permanent storage on the consumer device 106. The DRM server 108 plays no further role in the ongoing use of those rights.

In general, "content sets" can be thought of as a related set of one or more digital content files, buffers or streams. In general, "rights" can be thought of as an electronic description (explicit or by implication) of the association between consumers (or consumer devices) and DRM-protected content sets. Rights can optionally specify means of identifying the consumer (or consumer device) to which the rights "belong"; means of identifying the content sets and subsets to which the rights apply; encryption keys and checksums (cryptographic or otherwise); and the specific access rights granted to the consumers (and/or their consumer devices) over those content sets (e.g. whether or not the consumer can print a document, the duration of access, etc.). Rights can be encoded in any machine-readable form (e.g. parsable languages, specialised data structures, etc.) and are used internally by the DRM system to grant, deny or meter consumer access to encrypted content. In general, "node locks" can be thought of as rights that are tied to a particular consumer device or "node", i.e. rights that will only provide access to DRM-encrypted content on one particular consumer device.

It is preferable for a DRM system to issue rights to a consumer for the shortest possible time: the rights are preferably issued at the time the consumer actually attempts to access the encrypted content and preferably removed from the consumer device as soon thereafter as possible. In preferred implementations, this implies that the rights are stored on a remote server hosted on a network (e.g., the Internet or an intranet). The consumer identifies herself to the local DRM system which transparently opens network connections to the remote server to obtain the rights which are then used to decrypt and access the encrypted content.

One problem with issuing rights at the time of access attempt is that many consumers may not have an Internet (or intranet) connection at the time they wish to access the encrypted content, perhaps due to being on a flight with a laptop computer onto which encrypted content has been downloaded. If the rights are stored on a remote networked server, the consumer in this case (for flights lacking network connections) cannot connect to the DRM server and therefore cannot access the encrypted content. This lack of guaranteed Internet (or intranet) access has led many DRM solution providers to store the consumer's rights on the fixed or removable disk drives of the consumer device. Storing the rights on the consumer device, however, creates another drawback in that it becomes trivial for the consumer to redistribute the stored rights on to other consumers and therefore defeat the basic copyright protection of the DRM system.

Figure 2:
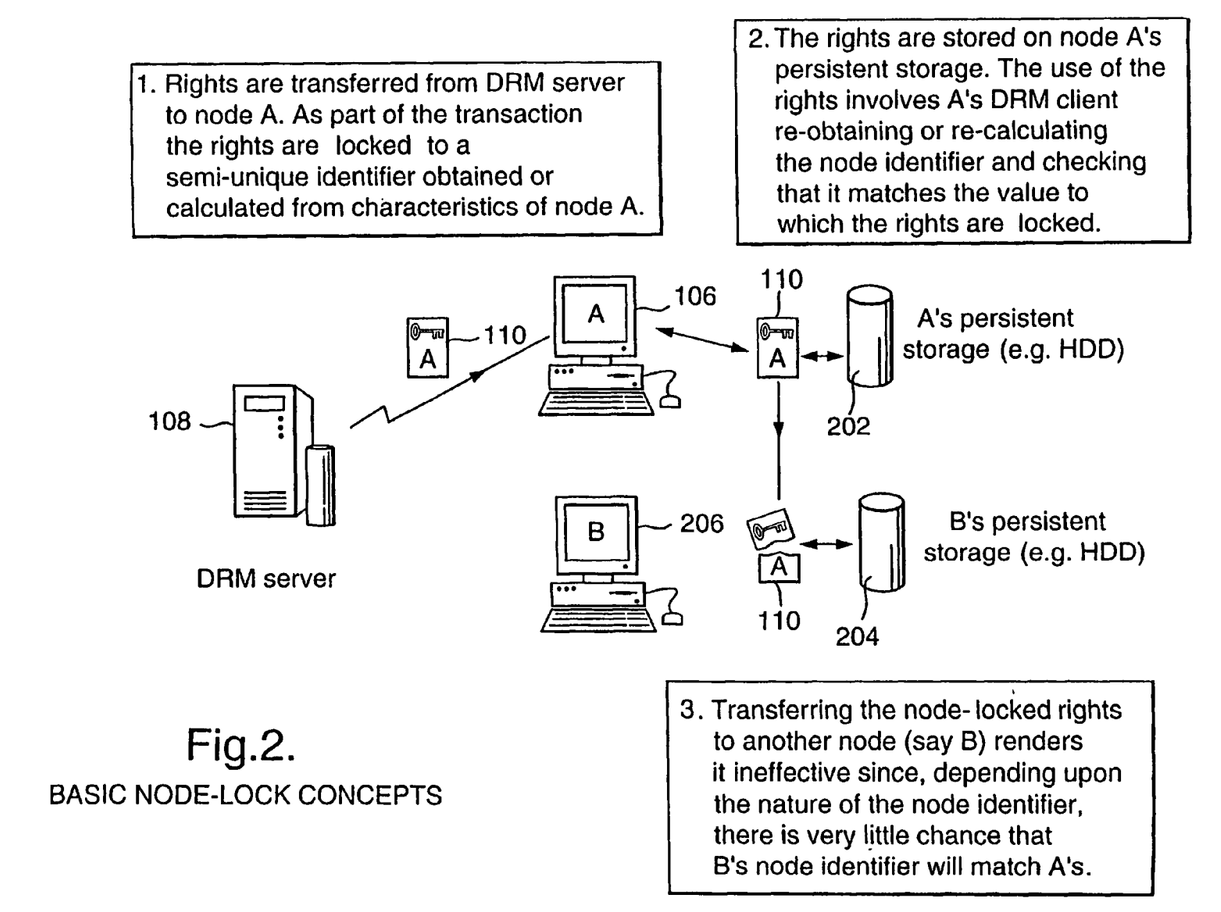
FIG. 2 illustrates schematically limitations of prior art node locking.

In order to overcome this drawback, typical DRM solutions that store the rights on the consumer device implement a "node-lock", i.e. rights that are that somehow tied to the consumer device and cannot therefore be usefully copied to another device. FIG. 2 illustrates schematically the basic "node-lock" concept in the context of consumers attempting to access DRM-encrypted content on two consumer devices 106 and 206 (for example, personal computers). The assumption is that there are DRM clients installed on both consumer devices 106 and 206 and that the DRM-encrypted content is either stored locally or obtained from a network. In order to obtain access to DRM-protected content on consumer device 106, the locally installed DRM client obtains rights 110 from a remote DRM server 108. As part of the DRM transaction, those rights 110 are "locked" to a pseudo- or semi-unique node identifier obtained or calculated from characteristics of consumer device 106. The "locked" rights 106 are then stored in persistent storage belonging to consumer device 106. Subsequent use of the locally stored rights 110 involve the DRM client on consumer device 106 re-obtaining or re-calculating the node identifier of consumer device 106 and checking that it matches the value to which the rights 110 were originally locked. Transferring the "node-locked" rights to persistent storage on consumer device 206 renders them ineffective since, depending upon the nature of the node identifier, there is very little chance that the DRM client on consumer device 206 will obtain or calculate a node identifier (for consumer device 206) that matches that of the transferred rights (which are locked to the node identifier of consumer device 106).

Thus, a disadvantage with node-locked rights is that the consumer is now restricted to accessing the DRM-encrypted content on one (or at most a few) consumer devices. This is increasingly bothersome as consumers become increasingly mobile and migrate between business desktop machines, laptops, palmtops and home computers. The increasing availability of network-enabled computers, any of which can be used to access Internet or intranet hosted services, makes simple node-locking closely resemble is the much despised PC copy-lock software protection schemes.

What is desired, then, is to extend the concept of node locking to account for an increasingly mobile consumer community.

According to a first aspect of the present invention, there is provided a digital rights management (DRM) system governing whether DRM-protected content can be rendered on a content rendering device, wherein at least one rights specification governing access to DRM-protected content on the content rendering device is tied to a first node identifier that is based on a characteristic of a mobile device coupleable to the content rendering device, the system comprising: a DRM client arranged to operate within the content rendering device and which has access to the at least one rights specification governing access to the DRM-protected content; wherein the at least one rights specification is restricted to apply to at least one node identifier; the DRM client being arranged to retrieve said characteristic of a mobile device coupleable to the content rendering device, to generate the first node identifier based on said characteristic, and to check that the first node identifier matches the or at least one node identifier to which the at least one rights specification is restricted; herein access to the DRM-protected content by the content rendering device is granted subject to the at least one rights specification available to the DRM client and subject to the first node identifier matching the or at least one node identifier to which the at least one rights specification is restricted.

According to a second aspect of the present invention, there is provided a method of accessing digital rights management (DRM) protected content for rendering by a content rendering device, wherein at least one rights specification governing access to the DRM-protected content on the content rendering device is tied to a first node identifier that is based on a characteristic of a mobile device coupleable to the content rendering device, the at least one rights specification being restricted to apply to at least one node identifier, the method comprising the steps of: retrieving from a mobile device coupled to the content rendering device said characteristic of the mobile device coupled to the content rendering device; generating the first node identifier based on said characteristic; and, checking that the first node identifier matches the or at least one node identifier to which the at least one rights specification is restricted; wherein access to the DRM-protected content by the content rendering device is granted subject to the at least one rights specification available to the DRM client and subject to the first node identifier matching the or at least one node identifier to which the at least one rights specification is restricted.

According to a third aspect of the present invention, there is provided a digital rights management (DRM) system governing whether DRM-protected content can be rendered on a content rendering device, wherein at least one rights specification governing access to DRM-protected content on the content rendering device is obtained from a mobile device coupleable to the content rendering device, the system comprising: a DRM client arranged to operate within the content rendering device that is to retrieve from the mobile device the at least one rights specification applying to the DRM-protected content which the content rendering device is attempting to render; wherein access to the DRM-protected content by the content rendering device is granted subject to the at least one rights specification obtained by the DRM client from the mobile device.

According to a fourth aspect of the present invention, there is provided a method of accessing digital rights management (DRM) protected content for rendering by a content rendering device, wherein at least one rights specification governing access to DRM-protected content on the content rendering device is obtained from a mobile device coupleable to the content rendering device, the method comprising the steps of: retrieving from the mobile device the at least one rights specification applying to the DRM-protected content which the content rendering device is attempting to render; wherein access to the DRM-protected content by the content rendering device is granted subject to the at least one rights specification obtained from the mobile device.

According to a fifth aspect of the present invention, there is provided a digital rights management (DRM) system for managing access to content on a content rendering device that is coupled to a wireless device that is coupled to a wireless network, wherein usage of the wireless device on the wireless network produces billing information that is accounted for by a billing system, the system comprising: a DRM server for coupling to a said wireless network and arranged to provide at least one rights specification for gaining access to content on a said content rendering device, the DRM server being arranged to account for usage of the DRM-protected content and to provide billing information based on the usage of the DRM-protected content to a said billing system, such that the said billing system can consolidate billing information based on the usage of the DRM-protected content with billing information based on the usage of the wireless device.

In accordance with one preferred embodiment of the present invention, rights are associated with a pseudo- or semi-unique node identifier obtained or calculated from characteristics of a mobile device attached to a consumer device, rather than with the node identifier of the consumer device itself. The user of the consumer device may access the DRM-encrypted content (which may come from local persistent storage or via a network) by attaching the mobile device to the consumer device. In this way, the rights can be associated with the node identifier of the mobile device, and the rights are thus usable for the consumer device to access the encrypted content.

Embodiments of the present invention will now be described by way of example with reference to the accompanying drawings, in which.

Figure 3:
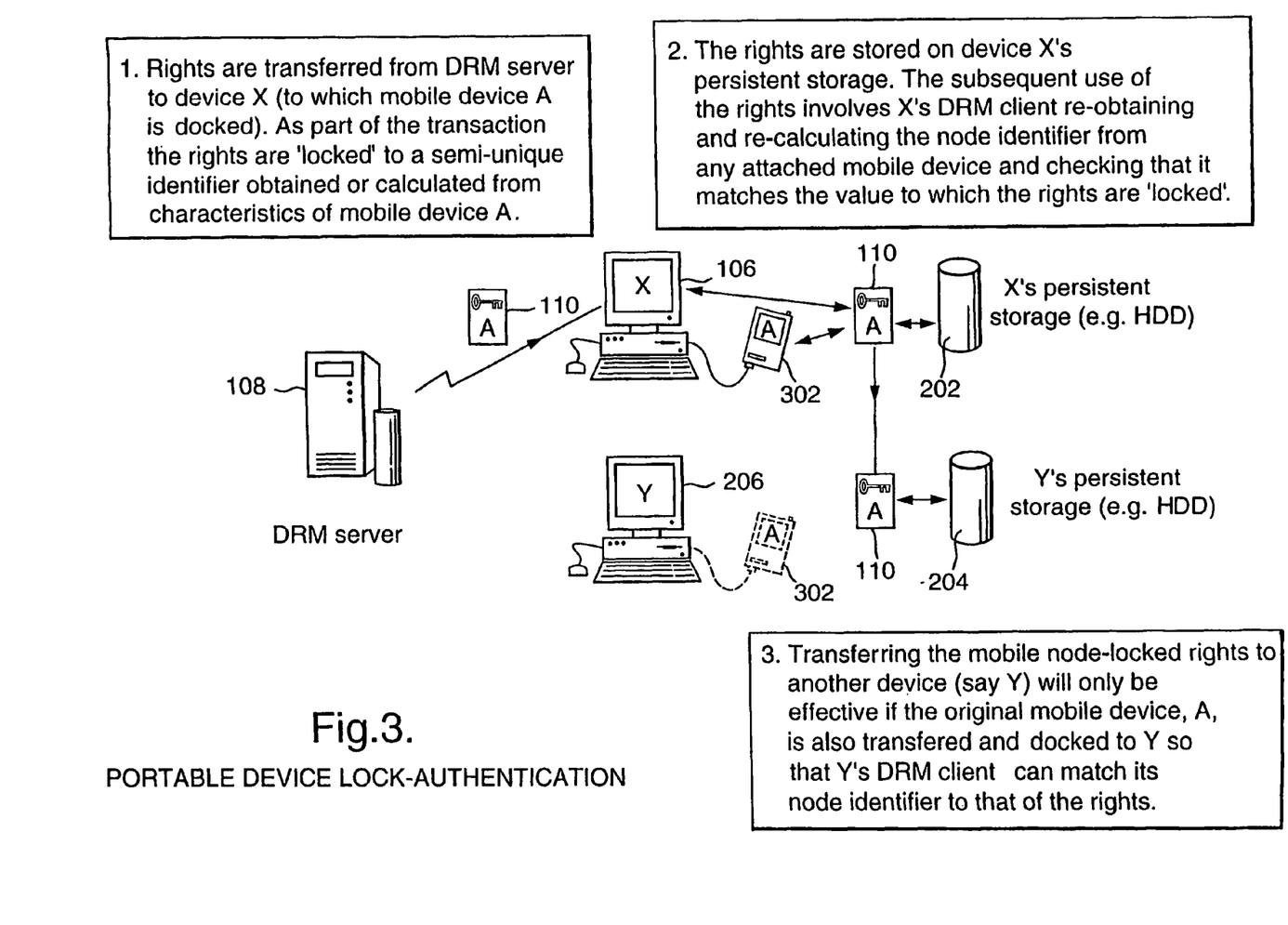
FIG. 3 illustrates schematically an example of an embodiment in accordance with the present invention for mobile device lock authentication.

Referring first to FIG. 3, this figure illustrates schematically an embodiment of the present invention that is similar to the conventional node-locked solution illustrated in FIG. 2. However, in accordance with the FIG. 3 embodiment of the invention, the rights 110 are associated (as part of the transaction with the DRM server 108) with a semi-unique node identifier obtained or calculated from characteristics of a mobile device 302 attached to a consumer device 106 (e.g. a personal computer), rather than with the node identifier of the consumer device 106. Note that DRM server as referred to herein refers to just DRM server software or both DRM server software and hardware. Thus, the user of the consumer device 106 may access the DRM-encrypted content (which may come from local persistent storage 202 or the network) by attaching the mobile device 302 to the consumer device 106. In this way, the rights 110 can be associated with the node identifier of the mobile device 302, and the rights 110 are thus usable for the consumer device 106 to access the encrypted content.

The consumer device 106 may be, for example, a personal computer, a set-top box or any other consumer device not typically carried on a consumer's person. The mobile device 302 may be, for example: a palmtop (e.g. Palm Pilot) computer, a cellular phone, a portable audio device, or other mobile device. In one embodiment, the mobile device is a mobile communications device having means by which the mobile device can connect to a telecommunications network, such connection being optionally wireless or cabled. Some form of consumer identity can be deduced from each of these devices, e.g. the telephone number of the mobile telephone, a synchronisation id or email address from the palmtop or a security id from a portable audio device. In this embodiment, a new type of node-locked rights is stored on the consumer device, one that is tied to the mobile device attached to the consumer device rather than to the consumer device itself. The new type of rights contain some information about the mobile device and can only be used by the local DRM solution if it can verify (preferably via some electronic challenge and response protocol with the mobile device) that the correct mobile device is attached to the consumer device.

In another embodiment, the rights locked to the mobile device can only be used by the local DRM solution within a configurable time period of it last verifying (via some electronic challenge and response protocol with the mobile device) that the correct mobile device was attached to the consumer device, so that the mobile device does not need to be permanently connected to the consumer device.

Advantages of this new type of node-locked rights include (a) that the consumer can now access encrypted content on any device to which the mobile device can be attached; (b) that the consumer cannot easily make copies of the mobile device and thereby defeat the DRM solution; (c) that the consumer no longer requires a network connection once the rights are stored on the consumer device; (d) mobile devices are inherently less vulnerable to tampering than many consumer devices, e.g. personal computers.

Figure 4:
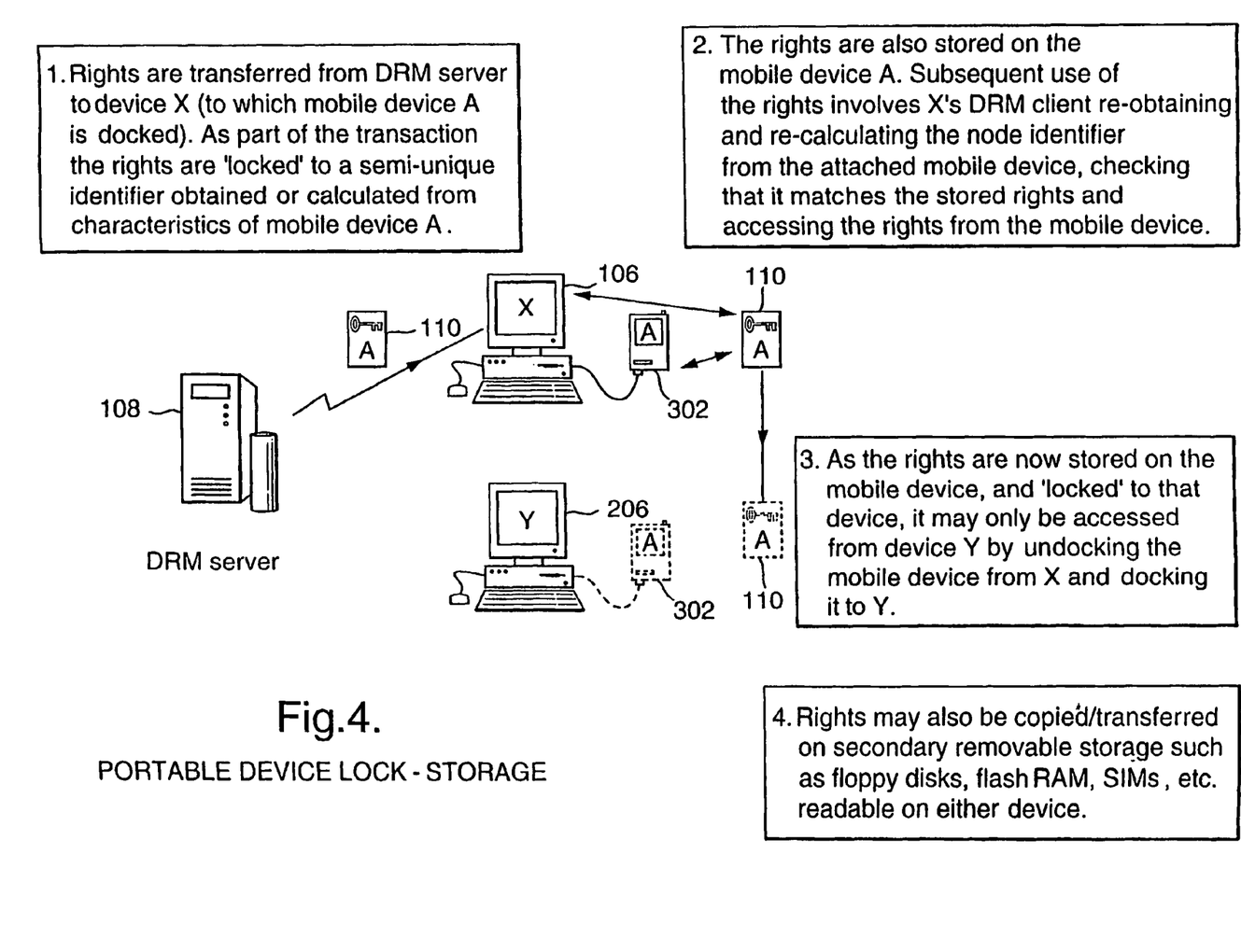
FIG. 4 illustrates schematically a variation the FIG. 3 embodiment, whereby the rights are stored on the mobile device used for authentication.

In accordance with further embodiments, as illustrated in FIG. 4, the rights 110 are stored in the persistent storage (e.g. non-volatile RAM) of the mobile device 302 itself, as such devices are routinely coupled to consumer devices (e.g. personal computers) such that the storage in the mobile device is accessible to the consumer device. For example, mobile telephones are connectable to personal computers in order to provide the personal computer with a wireless data modem connection. Palmtop computers are connectable to personal computers to synchronise email, contact and scheduling information. Portable audio players (e.g. portable MP3 players) are connectable to personal computers for transferring audio tracks downloaded from the Internet to the portable device.

Some form of consumer identity can be deduced from each of these devices, e.g. the telephone number or network address of the mobile telephone, a synchronisation id or email address from the palmtop computer, or a security id from a portable audio device. In addition, each of these devices has some form of persistent on-device storage, e.g. SIM cards on mobile telephones, battery-backed RAM on palmtop computers, flash RAM on portable audio players. The rights stored in the persistent on-device storage in this embodiment may include some information about the mobile device, and the rights can only be used by the local DRM solution if it can be verified (by, for example, some electronic challenge and response protocol with the mobile device) that the rights are stored on the correct mobile device attached to the consumer device, using the node identifier obtained or calculated from characteristics of the mobile device. In similar but alternative embodiments, the rights 110 are stored on a removable secondary storage medium (capable of being read by either the consumer device or the mobile device) such as a floppy disk or a removable memory card or pack.

In another embodiment, the rights obtained from the mobile device can only be used by the local DRM solution on the consumer device within a configurable time period of it last verifying (via some electronic challenge and response protocol with the mobile device) that the mobile device from which the rights were obtained was attached to the consumer device, so that the mobile device does not need to be permanently connected to the consumer device.

Figure 5:
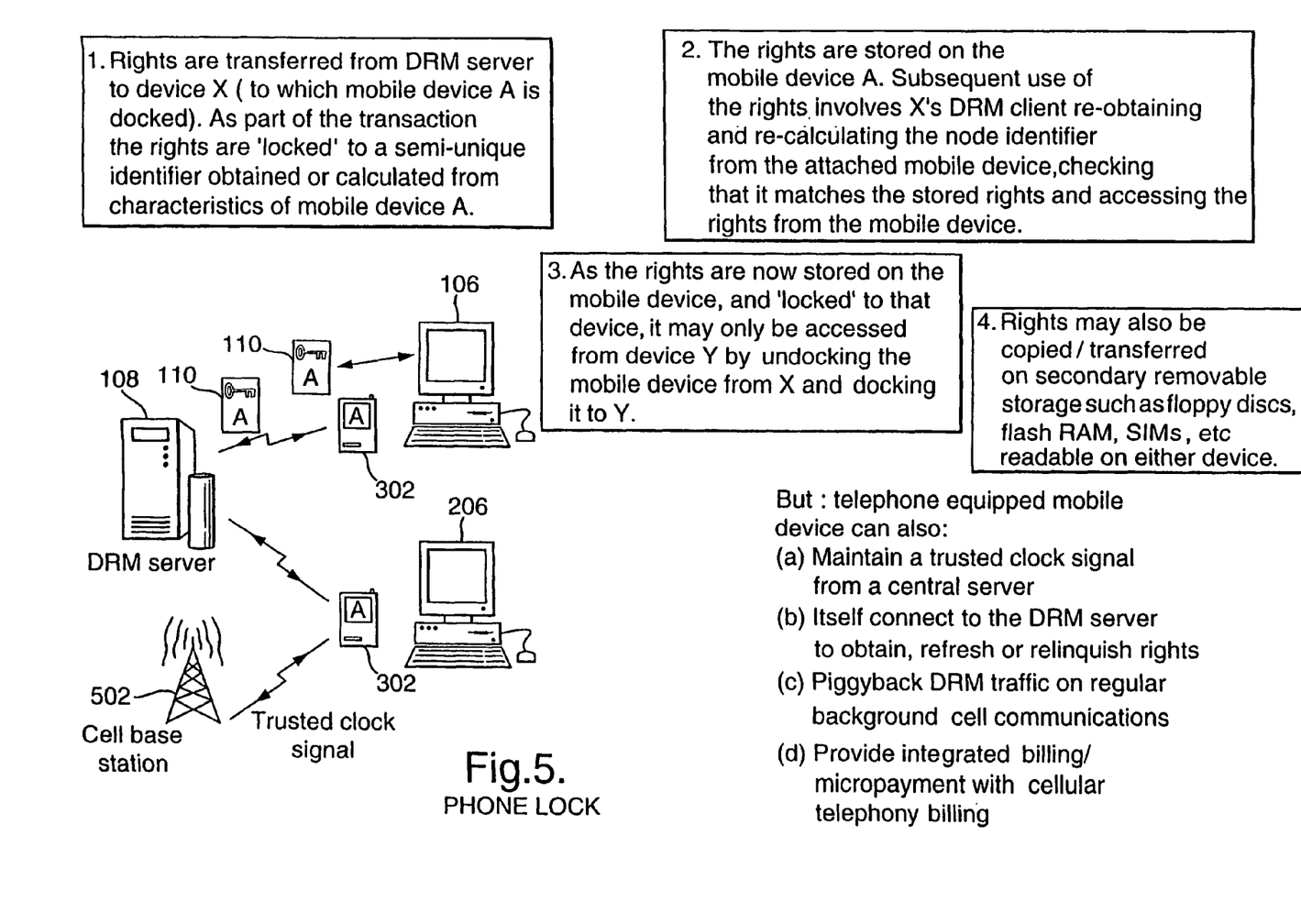
FIG. 5 illustrates an example of mobile device lock authentication making use of a wireless network in accordance with an embodiment of the present invention; and, FIG. 6 illustrates an example of mobile device lock authentication making use of smart cards in accordance with an embodiment of the present invention.

In accordance with further embodiments, discussed with reference to FIG. 5, wireless network capabilities are used to enhance the effectiveness of a mobile device locking solution. There is a trend to unify wireless network capabilities with mobile computing devices (whether general purpose or special purpose computing devices). As discussed above, these mobile devices typically provide reasonable verification that the holder of the device is an authorised rights user, because wireless mobile devices must have a unique network address (such as a telephone number) in order to route communication traffic to/from the wireless mobile device and this address is closely tied to the holder of the device. Furthermore, mobile telephones already make periodic communication to a local cell (designated by reference numeral 502 in FIG. 5) and are inherently networked devices.

In accordance with these further embodiments, the wireless connection (either using on-demand dial-up connections or via the background cell communications) is used for obtaining, refreshing or relinquishing rights to/from a remote DRM server. In practical DRAM applications, DRM clients must obtain rights from a DRM server, may sometimes refresh (effectively re-request) those rights from a DRM server in order to prevent them relapsing to the DRM server and being issued to other DRM clients, and may relinquish those rights back to a DRM servers when they are no longer required (so that they may be issued to other DRM clients). The wireless connection can also be used to obtain a trusted clock signal from a central server (not necessarily the DRM server) which can be used to reliably control start and stop times for DRM-managed access. Such control is reliable because the clock obtained from for example the cellular system is a trusted clock (as opposed to a clock on the computing device that can often be manipulated by the user). Furthermore, the wireless connection can also be used to send auditing information to a central server for reporting and/or billing of use of DRM-protected content. In addition, mobile telephones already have established billing channels, so access to encrypted information is relatively easily added onto the consumer's telephone bill, providing detailed usage reporting and providing a means for clearing the smallest payments (i.e. an effective micropayment system, where small individual DRM charges are included within the larger consolidated telephone bill).

Figure 6:
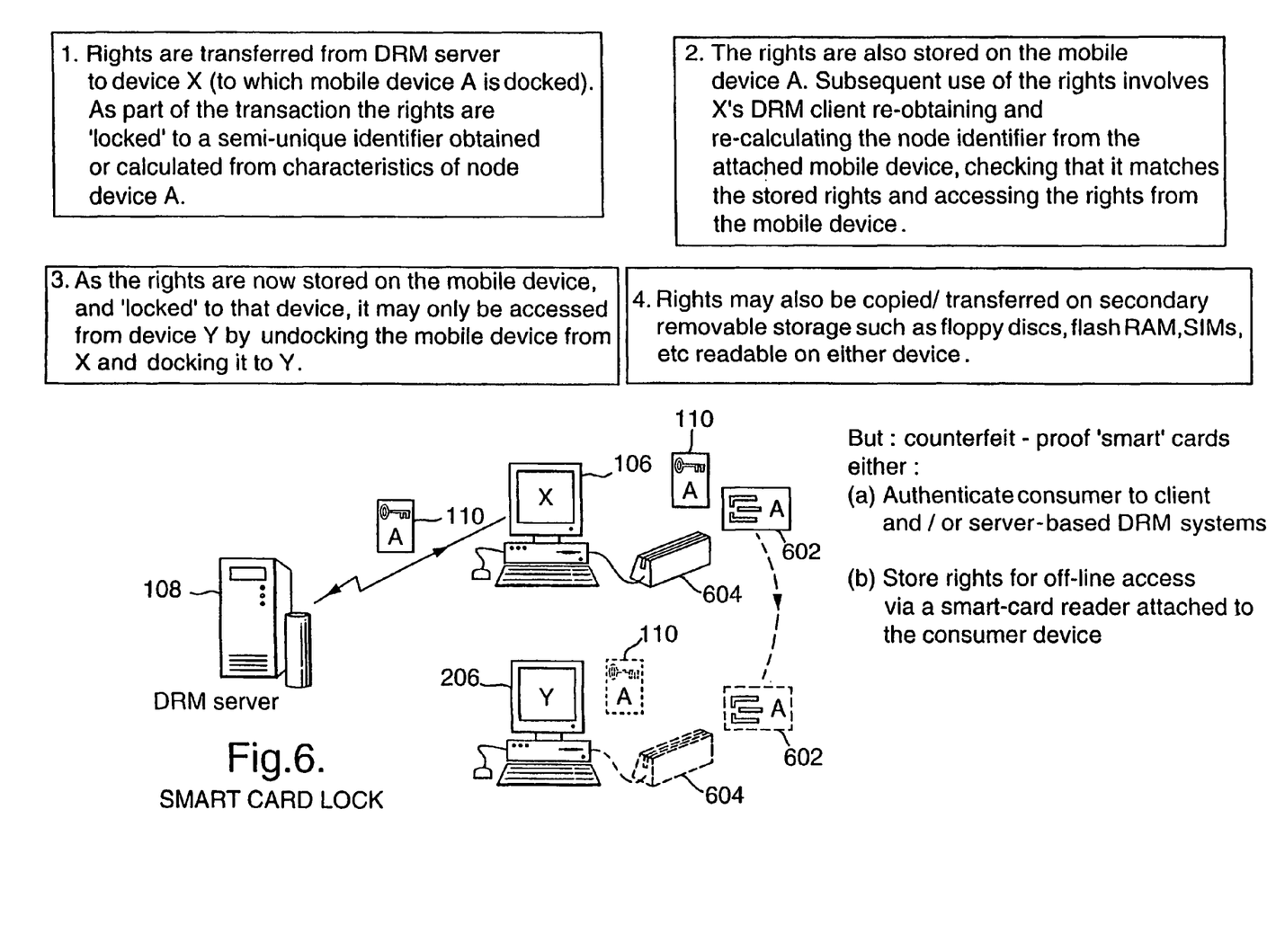

In accordance with yet another embodiment, illustrated in FIG. 6, the rights 110 provided from the DRM server 108 are stored on a "smart card" 602, the smart card 602 is used to authenticate the user, or a combination of both. Thus, any DRM-enabled consumer device (such as consumer device 106 and consumer device 206) may employ the rights to access DRM-encrypted content so long as access to the smart card is provided to the consumer device via a smart card reader 604.

In accordance with the FIG. 6 embodiment, the consumer can now access DRM-encrypted content on any DRM-enabled consumer device on which the smart card can be read. In addition, the consumer cannot easily make copies of the smart card and thereby defeat the DRM solution. The need for a network connection is minimised or eliminated.

In accordance with the invention, mobile devices are used to enhance conventional DRM solutions, to accommodate the increasing mobility of DRM users without diminishing (and in some cases, enhancing) the security aspects of the DRM system.

Embodiments of the present invention have been described with particular reference to the examples illustrated. However, it will be appreciated that variations and modifications may be made to the examples described within the scope of the present invention.

The invention claimed is:

1. A digital rights management (DRM) system comprising:
   a content rendering device for rendering DRM-protected content, wherein at least one rights specification governs access to DRM-protected content on the content rendering device;
   a mobile device having a wireless networking capability and a characteristic, the mobile device being coupleable to the content rendering device;
   a DRM client arranged to operate within the content rendering device and which has access to the at least one rights specification governing access to the DRM-protected content, the at least one rights specification being accessible independently of the DRM-protected content and being tied to a first node identifier that is based on the characteristic of the mobile device,
   wherein the at least one rights specification is restricted to apply to at least one node identifier,
   wherein the DRM client is arranged to retrieve said characteristic from the mobile device coupled to the content rendering device, to generate the first node identifier based on said characteristic, and to check that the first node identifier matches the at least one node identifier to which the at least one rights specification is restricted,
   wherein access to the DRM-protected content by the content rendering device is granted subject to the at least one rights specification available to the DRM client and subject to the first node identifier matching the at least one node identifier to which the at least one rights specification is restricted, and
   wherein the DRM client is arranged to communicate with a DRM server by way of the wireless networking capability of the mobile device.

2. A system according to claim 1, wherein the DRM client is arranged to deny access when the mobile device is not coupled to the content rendering device.

3. A system according to claim 1, wherein the DRM client is arranged to deny access to DRM-protected content after a configurable time period elapses after the DRM client detects that the mobile device is no longer coupled to the content rendering device.

4. A system according to claim 1, wherein the first node identifier for the mobile device is based on a network address of the mobile device.

5. A system according to claim 1, wherein the DRM client is arranged to receive a trusted clock by way of the wireless networking capability of the mobile device.

6. A system according to claim 1, wherein the DRM client is arranged to obtain at least one rights specification from a DRM server by way of the wireless networking capability of the mobile device.

7. A system according to claim 1, wherein the DRM client is arranged to relinquish at least one rights specification to a DRM server by way of the wireless networking capability of the mobile device.

8. A system according to claim 1, wherein the DRM client is arranged to send auditing information to a DRM server by way of the wireless networking capability of the mobile device.

9. A method of accessing digital rights management (DRM) protected content for rendering by a content rendering device, wherein at least one rights specification governing access to the DRM-protected content on the content rendering device is tied to a first node identifier that is based on a characteristic of a mobile device coupleable to the content rendering device, the at least one rights specification being restricted to apply to at least one node identifier and being accessible independently of the DRM-protected content, the method comprising:
   retrieving from a mobile device coupled to the content rendering device said characteristic of the mobile device coupled to the content rendering device;
   generating the first node identifier based on said characteristic;
   checking that the first node identifier matches the at least one node identifier to which the at least one rights specification is restricted;
   granting the content rendering device access to the DRM-protected content according to the at least one rights specification available to the DRM client when the first node identifier matches the at least one node identifier to which the at least one rights specification is restricted; and communicating with a DRM server by way of the wireless networking capability of the mobile device.

10. A method according to claim 9, wherein access to the DRM-protected content is denied when the mobile device is not coupled to the content rendering device.

11. A method according to claim 9, wherein access to the DRM-protected content is denied after a configurable time period elapses after the mobile device is no longer coupled to the content rendering device.

12. A method according to claim 9, further comprising obtaining the at least one rights specification from a DRM server by way of the wireless networking capability of the mobile device.

13. A method according to claim 12, further comprising storing the at least one rights specification on the mobile device such that the at least one rights specification can be obtained on demand from the mobile device without requiring the mobile device to connect to the DRM server.

14. A method according to claim 9, further comprising relinquishing the at least one rights specification to a DRM server by way of the wireless networking capability of the mobile device.

15. A method according to claim 9, further comprising sending auditing information to a DRM server by way of the wireless networking capability of the mobile device.

16. A system according to claim 1, wherein:
the at least one rights specification governing access to DRM-protected content on the content rendering device is obtained from the mobile device coupleable to the content rendering device,
the DRM client is arranged to retrieve from the mobile device the at least one rights specification, and
access to the DRM-protected content by the content rendering device is granted subject to the at least one rights specification obtained by the DRM client from the mobile device.

17. A system according to claim 16, wherein the at least one rights specification obtained from the mobile device is tied to the node identifier of the mobile device, thereby preventing the at least one rights specification from being obtained from another mobile device.

18. A system according to claim 16, wherein the mobile device contains a tamper-proofing mechanism to prevent unauthorised access to the at least one rights specification.

19. A system according to claim 16, wherein the DRM client on the content rendering device and the mobile device are arranged to use a challenge-response protocol to establish trust between them.

20. A system according to claim 16, wherein the DRM client is arranged to deny access to the DRM-protected content after a predetermined time period elapses after the DRM client detects that the mobile device is no longer coupled to the content rendering device.

21. A system according to claim 16, wherein the DRM client is arranged to establish a consumer identity based upon a network address of the mobile device.

22. A system according to claim 16, wherein the DRM client is arranged to receive a trusted clock by way of the wireless networking capability of the mobile device.

23. A system according to claim 16, wherein the DRM client is arranged to obtain at least one rights specification from a DRM server by way of the wireless networking capability of the mobile device.

24. A system according to claim 16, wherein the DRM client is arranged to relinquish at least one rights specification to a DRM server by way of the wireless networking capability of the mobile device.

25. A system according to claim 16, wherein the DRM client is arranged to send auditing information to a DRM server by way of the wireless networking capability of the mobile device.

26. A method according to claim 9, further comprising the step of:
retrieving from the mobile device the at least one rights specification applying to the DRM-protected content which the content rendering device is attempting to render;
wherein access to the DRM-protected content by the content rendering device is granted subject to the at least one rights specification obtained from the mobile device.

27. A method according to claim 26, wherein the at least one rights specification obtained from the mobile device is tied to the node identifier of the mobile device, thereby preventing the at least one rights specification from being obtained from another mobile device.

28. A method according to claim 26, wherein access to the DRM-protected content is denied after a configurable time period elapses after the mobile device is no longer coupled to the content rendering device.

29. A method according to claim 26, further comprising obtaining the at least one rights specification from a DRM server by way of the wireless networking capability of the mobile device.

30. A method according to claim 29, further comprising storing the at least one rights specification on the mobile device such that the at least one rights specification can be obtained on demand from the mobile device without requiring the mobile device to connect to the DRM server.

31. A method according to claim 26, further comprising relinquishing the at least one rights specification to a DRM server by way of the wireless networking capability of the mobile device.

32. A method according to claim 26, further comprising sending auditing information to a DRM server by way of the wireless networking capability of the mobile device.

* * * * *